United States Patent
Gibbon et al.

(10) Patent No.: US 7,657,561 B2
(45) Date of Patent: *Feb. 2, 2010

(54) METHOD FOR PROVIDING A COMPRESSED RENDITION OF A VIDEO PROGRAM IN A FORMAT SUITABLE FOR ELECTRONIC SEARCHING AND RETRIEVAL

(76) Inventors: David Crawford Gibbon, 107 Majestic South, Lincroft, NJ (US) 07738; Behzad Shahraray, 194 Sherwood Dr., Freehold, NJ (US) 07728

( * ) Notice: Subject to any disclaimer, the term of this patent is extended or adjusted under 35 U.S.C. 154(b) by 185 days.

This patent is subject to a terminal disclaimer.

(21) Appl. No.: 10/429,610

(22) Filed: May 5, 2003

(65) Prior Publication Data

US 2003/0208626 A1 Nov. 6, 2003

Related U.S. Application Data

(63) Continuation of application No. 09/625,039, filed on Jul. 24, 2000, now Pat. No. 6,581,070, which is a continuation of application No. 08/679,976, filed on Jul. 15, 1996, now Pat. No. 6,098,082.

(51) Int. Cl.
G06F 7/00 (2006.01)
G06F 17/00 (2006.01)
G06F 17/20 (2006.01)
(52) U.S. Cl. ..................... 707/104.1; 715/202
(58) Field of Classification Search ............ 707/3, 707/6, 10; 715/202, 752; 709/203, 209, 709/228; 725/47
See application file for complete search history.

(56) References Cited

U.S. PATENT DOCUMENTS

| 5,241,671 | A | | 8/1993 | Reed et al. |
| 5,708,826 | A | * | 1/1998 | Ikeda et al. ............... 715/501.1 |
| 5,710,918 | A | * | 1/1998 | Lagarde et al. ................. 707/10 |
| 5,754,766 | A | * | 5/1998 | Shaw et al. .................. 709/200 |
| 5,806,068 | A | * | 9/1998 | Shaw et al. ............. 707/103 R |
| 5,874,986 | A | | 2/1999 | Gibbon et al. |
| 5,930,808 | A | * | 7/1999 | Yamanaka et al. ........ 715/501.1 |
| 6,098,082 | A | | 8/2000 | Gibbon et al. |
| 6,166,735 | A | | 12/2000 | Dom et al. |

OTHER PUBLICATIONS

Wactlar et al, "Intelligent Access To Digital Video: Informedia Project," pp. 1-13, May 1996.
Aronson, "HTML 3 Manual Of Style," pp. 1-9, 51-64, 91-109, 1995.
Shahraray, et al, "Automatic Generation of Pictorial Transcripts of Video Programs," Multimedia Computing and Networking, pp. 1-7, 1995.
Shahraray, et al, "Automatic Authoring of Hypermedia of Video Programs," Proceedings 3rd Int. Conf. On Multimedia, ACM Multimedia, 1995, Nov. 9, 1995.

* cited by examiner

*Primary Examiner*—Apu M Mofiz
*Assistant Examiner*—Susan Y Chen

(57) ABSTRACT

A compressed rendition of a video program is provided in a format suitable for electronic searching and retrieval. An electronic pictorial transcript representation of the video program is initially received. The video program has a video component and a second information-bearing media component associated therewith. The pictorial transcript representation includes a representative frame from each segment of the video component of the video program and a portion of the second media component associated with the segment. The electronic pictorial transcript is transformed into a hypertext format to form a hypertext pictorial transcript. The hypertext pictorial transcript is subsequently recorded in an electronic medium.

6 Claims, 4 Drawing Sheets

FIG. 1

 Dr. HERBERT LEPOR (New York University): Its effectiveness does not equal that of surgery. There are still risks. And the long-term response is still--has still yet to be defined. HAGER: Still, the US Food and Drug Administration put approval of the procedure on a fast track and believes microwaving is a reasonable alternative to surgery or drugs.

 Robert Hager, NBC News, Washington, Anchor: And after another long weekend of charge and counter charge on the escalating prices of gasoline in this country, President Clinton went back on the offensive today. As NBC's Brian Willians tells us tonight, Senator Dole's plan to cut the last gas tax is now getting White House attention. BRAIN WILLIAMS reporting: Knowing full well that the way to a driver's heart is through the pump, Bob Dole on the Senate floor today sounded like a man determined to bring down the Clinton gas tax. Senator BOB DOLE (Republican, Majority Leader): Four point three cents may not seem like a lot per gallon, but it adds up to about .8 billion a year, and it doesn't go into any fund to build highways.

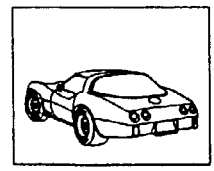 It goes into what we call deficit reduction. WILLIAMS: To the average driver, doing away with the 4.3 cent per gallon tax on gas would mean saving of about 7 a year.

 There are differing opinions on how the government could make up for that lost revenue.

 When House Leader Dick Armey suggested on "Meet The Press" that the money could come out of the education funding, that didn't go over very well. Mr. MICHAEL McCURRY (White House Press Secretary): The president would like both Senator Dole And Speaker Gingrich to make clear right away whether or not that is their intent. WILLIAMS: seeing a loss coming on the gas tax, Democrats are intent on passing an increase in the minimum wage.

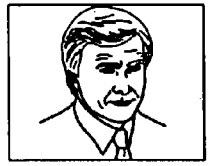 They'd like very much to tie it to the cut in the gas tax, offering that as a way everyone could win.

 Senator TOM DASCHLE (democrat, Minority Leader): Let's try to marry it with something that really would have resonance a 45 cent increase in the minimum wage this year and another 45 cent increase next year.

 That will really help the American people. WILLIAMS: The Republicans are banking on a very simple question here, and that is, what right-minded American driver is going to say no to cheaper gas between now and Memorial Day weekend? There's a larger question, of course, and that is, what right-minded American President is going to veto such a thing?

 That's what they're grappling with here at the White House, trying to make sure the savings gets passed on at the pump. Tom : BROKAW: Brian, when does all this come to a head? WILLIAMS: Bob Dole is going to bring this up

FIG. 3

 McCurry said British Prime Minister Major will visit the White House April 3rd and 4th. U.S.-British relation have bee strained over president Clinton's warming of relation the political leader of the Irish Republican Army.

 Robin? Authorities in Japan are searching for suspects in the release of poisonous nerve gas on the Tokyo <--> subway this morning.

 At least six people were killed, and more than 3,000 were injured.

 The deadly gas, sarin, was released at 16 subway stations throughout the city during morning rush hour.

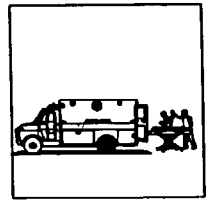 Officials are speculating it could have been a terrorist attack, but no one has claimed responsibility.

FIG. 4

Pictorial Transcript

Program Index

You can either generate a transcript for a specific keyword, or you can view the entire transcript (below.)

Keyword Specific Transcript

Choose a Term: America, Joan Lunden, Forrest Sawyer, Charles Gibson, Wednesday, Simpson, Cynthia, Steve, Seattle, Laredo, Texas, Michael, Julia Child, Morton, Tokyo, ABC, Ron, Allen, Brian, Nicole, Simpsons, Rockingham, Philip, Los Angeles, Ferguson, Long Island, New York, December, Richard, U.S., U.N, American, Clinton, Albright, Pentagon, Jamie, Sam Donaldson, Search for other terms:

Entire Program Transcript

This program has been divided into 2 pages of 25 images each and of the page of 3 images.
The star times are in minutes and seconds relative to the beginning of the program.

Select a page to view.

PAGE:1
TIME:0:00

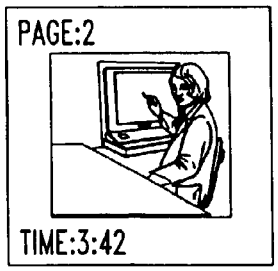
PAGE:2
TIME:3:42

PAGE:3
TIME:7:35

METHOD FOR PROVIDING A COMPRESSED RENDITION OF A VIDEO PROGRAM IN A FORMAT SUITABLE FOR ELECTRONIC SEARCHING AND RETRIEVAL

This application is a continuation of U.S. patent application Ser. No. 09/625,039, filed Jul. 24, 2000, now U.S. Pat. No. 6,581,070 which is a continuation of U.S. patent application Ser. No. 08/679,976, filed Jul. 15, 1996 now U.S. Pat. No. 6,098,082.

TECHNICAL FIELD

This invention relates generally to a method for automatically providing a compressed rendition of a video program in a format suitable for electronic searching and retrieval, and more particularly to a method for providing a compressed rendition of a video program in a format suitable for electronic searching and retrieval on the World Wide Web.

BACKGROUND

The rapid growth of the World Wide Web began with the development of an on-line browser having a graphical user interface. Graphical interfaces provide a number of important advantages, including the ability to rapidly scroll through a document to get to a particular point of interest. Moreover, the ability to interact with a medium other than text (i.e. images or audio) increases the rate at which information can be conveyed since an image often conveys an idea faster and more efficiently than text.

While graphical browsers provide an adequate interface for text and images, they provide an inadequate interface for video programs. The sequential nature of the video and audio components of a video program impedes rapid access to such programs on the World Wide Web by graphical browsers. Furthermore, because of the limited bandwidth of networks supporting the World Wide Web, and particularly the limitations of most users' connections to such networks, it takes a long time to transmit a program with its full content. For example, at a connection speed of 28,800 bits per second, it could take up to about 45 minutes to transmit even a three or four minute audiovisual segment with sound and full-motion video. As a result, video program providers sometimes form a compressed version of the video program by manually extracting and retaining selected frames from the program while other frames are discarded. The selected frames and accompanying text, typically taken from a transcript of the program, result in a document that may subsequently be made available over the World Wide Web. However, the generation of this document is typically a tedious and time consuming task since it must be created by a manual process.

Accordingly, it would be advantageous to provide a rendition of a video program which can be automatically generated and which allows easy interaction with graphical browsers with a minimum of information loss.

SUMMARY OF THE INVENTION

The present inventors have realized that a pictorial transcript representation of a video program is particularly well suited for on-line searching and retrieving applications such as browsing on the World Wide Web. Pictorial transcripts are compact representations of video programs which are automatically generated by selecting representative frames or images from the video program and combining them with a second media component such as audio or text which is associated with each representative frame. Properly chosen, the representative frames convey a substantial portion of the information content of the original video program. Moreover, pictorial transcripts may be generated in an automatic fashion, thus eliminating the substantial time and effort that was previously required to place a document of this type on the World Wide Web.

The inventive method provides a compressed rendition of a video program in a format suitable for electronic searching and retrieval. An electronic pictorial transcript representation of the video program is initially received. The video program has a video component and a second information-bearing media component associated therewith. The pictorial transcript representation includes a representative frame from each segment of the video component of the video program and a portion of the second media component associated with the segment. The electronic pictorial transcript is transformed into a hypertext format to form a hypertext pictorial transcript. The hypertext pictorial transcript is subsequently recorded in an electronic medium.

BRIEF DESCRIPTION OF THE DRAWINGS

FIG. 1 is an example of one page of a printed pictorial transcript generated from a television news program in accordance with method of the present invention.

FIG. 3 shows an example of a page format that may be employed when performing keyword searching.

FIG. 4 shows an example of an index that may be generated for HTML pictorial transcripts.

DETAILED DESCRIPTION

Figure 2:
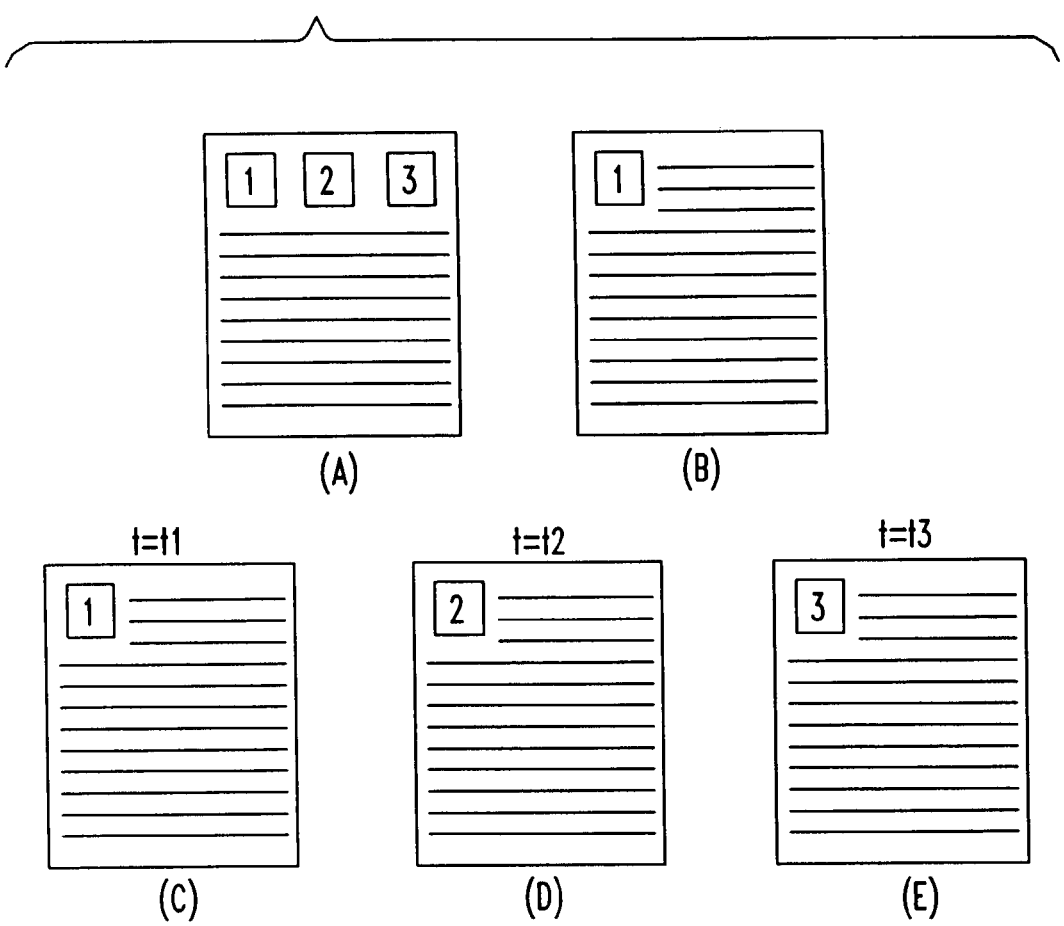
FIG. 2 illustrates the use of server push for viewing an HTML pictorial transcript.

A method for automatically compressing multimedia data is disclosed in U.S. patent application Ser. No. 08/252,861, filed Jun. 2, 1994, and Shahraray B., and Gibbon D. C., "Automatic Generation of Pictorial Transcripts of Video Programs," in *Multimedia Computing and Networking* 1995, Proc. SPIE 2417, February 1995, the latter reference being hereby incorporated by reference. In accordance with this known method, a video program is compressed by selecting certain frames from the entire sequence of frames to serve as representative frames. For example, a single frame may be used to represent the visual information contained in any given scene of the video program. A scene may be defined as a segment of the video program over which the visual contents do not change significantly. Thus, a frame selected from the scene may be used to represent the entire scene without losing a substantially large amount of information. A series of such representative frames from all the scenes in the video program provides a reasonably accurate representation of the entire video program with an acceptable degree of information loss. These compression methods in effect perform a content-based sampling of the video program. Additional information may be found in B. Shahraray, "Scene Change Detection and Content-Based Sampling of Video Sequences," *Digital Video Compression: Algorithms and Technologies* 1995, SPIE 2419.

In the previously cited documents, a plurality of representative frames are selected by sampling the video program in a content-based manner to retain a single representative frame from each scene. While the series of frames selected in this manner may not contain all the visual information in the original video program, when combined with another medium that was a part of the original video program, such as audio or closed-captioned text, the resulting multimedia program adequately conveys the information content of the video program in a condensed format. To generate this condensed multimedia program, a correspondence must be formed between the representative frames and the audio or textual medium. For example, each representative frame should be associated with the portion of the audio or textual medium corresponding to the entire scene from which the representative frame was selected. This correspondence may be accomplished in a relatively simple manner because in the original video program the video medium is already synchronized with the audio or textual information. Additional details concerning the formulation of this correspondence may be found in the previously cited references.

The representative frames, the audio or textual components associated therewith, and the correspondence between the representative frames and the audio or textual components comprise electronic data representing a condensed version of a video program, which hereinafter will be referred to as the condensed electronic data.

In the case of closed-captioned text, a printed rendition of the condensed electronic data may be provided. The printed rendition constitutes a so-called pictorial transcript in which each representative frame is printed with a caption containing the portion of the closed-caption text corresponding to the scene from which that representative frame is taken. FIG. 1 is an example of one page of printed pictorial transcript generated from a television news program. Alternatively, rather than printing the condensed electronic data as a pictorial transcript, the data simply may be electronically stored for subsequent retrieval. Thereafter the data may be printed, displayed on a computer, or transmitted in any desired format.

In addition, the condensed electronic data may be generalized further to refer to the series of representative frames and the audio segments corresponding thereto rather than closed-caption segments. In this case the condensed electronic data may be conveniently stored electronically and then displayed by sequentially displaying the representative frames and, simultaneous with each displayed frame, playing the corresponding audio segment.

In accordance with the present invention, electronic data representing a condensed version of a video program is formatted in hypertext markup language (HTML) so that the resulting HTML document is compatible with the World Wide Web. HTML documents refer to on-line documents having words or graphics that contain links to other on-line documents. Such documents are commonly referred to as hypertext documents. By selecting the link (using a mouse or key command) the user is connected to another document that may be located on the same or a different computer. It should be noted that while the present invention is described in terms of an on-line document formatted in HTML, more generally the present invention is applicable to hypertext documents formatted in languages other than HTML, such as hypercard, for example.

An HTML document is automatically produced from the condensed electronic data by an HTML generator, which converts the data into an HTML document. Procedures to implement such a generator are well known. As used hereinafter, the terms HTML document and HTML pictorial transcript refer to the condensed electronic data that is formatted in HTML. The HTML document or pictorial transcript may be composed of individual records connected by links. The individual records of the HTML document or pictorial transcript are referred to as pages.

The HTML pictorial transcript may be advantageously divided over two or more HTML pages, depending on the size of the document. An HTML document consisting of only a single HTML page is impractical for all but the shortest programs (e.g., less than ten minutes in length) because WWW browsers, which sometimes lack parallel loading capability, begin to exhibit unacceptable delays. In fact, even browsers having parallel loading capability such as Netscape will often be taxed. The size of each HTML page may be determined in any appropriate manner. For example, the HTML generator may begin a new page after a predetermined number of images (e.g., 25) have been placed on a single page. Alternatively, the pages may be divided on the basis of story and topic based segmentation. The various pages comprising the HTLM document may connected by hypertext links.

A graphical browser is a graphical interface that can access documents on the WWW in an HTML format. The HTML pictorial transcript may be conveniently accessed and searched using conventional graphical browsers such as Mosaic, Spry and Explorer, for example.

The HTML pictorial transcript may be displayed in a variety of different formats. The user may have the option of selecting among several predetermined formats, or alternatively, the user may customize a format via the web browser. The server, in turn, re-executes the HTML generator routine, which now produces the HTML document in the desired format. Additionally, if no selection is made, the HTML transcript may be displayed in a default format (which may be one of the standard formats). In some embodiments of the invention, the user may be provided with a plurality of different default formats from which to choose.

In one embodiment of the invention, a standard or default format displays an HTML pictorial transcript that is the equivalent of the printed rendition of a pictorial transcript such as shown in FIG. 1. Other formats may modify this particular format to reduce retrieval time and improve page layout. For example, some formats may be employed to reduce the required bandwidth by displaying only a subset of the representative frames contained in the HTML pictorial transcript. Many different criteria may be employed to determine which representative frames to retain and which to omit.

One criterion that may used to eliminate select representative frames is based on the presence of redundant frames. For example, if the original program contains a shot of a given scene at one time and subsequently contains substantially the same scene after one or more other scenes have intervened, the resulting pictorial transcript will contain two representative frames that are substantially the same. Accordingly, one of the redundant representative frames may be eliminated to reduce bandwidth. In the resulting HTML pictorial transcript it may be desirable to use a hypertext link in place of the second appearance of the redundant representative frame which links back to the first appearance of the representative frame.

Other criteria that may used to eliminate select representative frames are based on random subsampling (e.g., retain every other representative frame) or, alternatively, the size of the JPEG image file. For example, it may be desirable to retain only the largest of the image files on the assumption that image size is correlated with the complexity of the image. More complex images typically convey more information. Conversely, it may be desirable to retain only the smallest of the image files to further minimize bandwidth requirements. Alternatively, it may be advantageous to retain only representative images that differ from one another by more than a prescribed amount, as determined by scene matching techniques. The representative images that are eliminated in this manner may be replaced by hypertext anchors linked to the similar representative images that were retained.

Another criterion that may be employed to select a subset of the representative images is based on the length of the scene from which the representative image was taken. For example, only representative images taken form the longest of the scenes in the video program may be retained since these scenes are presumably the most significant. For example, a video program of a speaker making a presentation before an audience may contain many longer scenes of the speaker interrupted by occasional brief shots of the audience. If the representative frames from only the longest scenes are retained, then representative frames of the speaker will be retained while the representative frames of the audience will be eliminated.

In some cases it may be desirable to eliminate representative frames associated with advertisements if the video programs are recorded from commercial television, for example. These representative frames may be easily removed because most commercials are either not captioned or are captioned in a mode different from the remainder of the video program. Accordingly, the change in caption modes can be used to detect advertisements which are to be omitted from the HTLM transcript.

Another format that may be used to display HTML pictorial transcripts takes advantage of a mechanism known as server push, which is available on recent versions of the Netscape browser. Server push allows an HTML page to undergo changes while it is being viewed. This browser feature can be used to maintain a suitable page layout (e.g., a layout having a maximum number of images) without needing to eliminate sequentially occurring images. This feature, which could also be implemented using Java Animations, will be illustrated with reference to FIG. 2. FIG. 2(a) shows an HTML page of a pictorial transcript which has three sequential images 1, 2, and 3, without any intervening captions. However, suppose the page format which is selected dictates that only one image is to be displayed on a page, as in FIG. 2(b). Server push may be used display the images as shown in FIGS. 2(c)-2(e). When the page is first displayed at time t1 in FIG. 2(c), only the first image is displayed. Using server push, the second image can be displayed at a later time t2 (e.g. one second later), as shown in FIG. 2(d). At yet a later time t3 the third image can be displayed, as in FIG. 2(e). Moreover, if the network bandwidth and client and server throughput are sufficiently high, video shorts (real-time playback) can be made to appear at the caption breaks.

In many cases a user will not be interested in viewing the HTML pictorial transcript in a sequential manner. Rather, the user may be only interested in those portions of the transcript that pertain to a particular topic. In such cases the user may wish to perform a keyword search of the HTML pictorial transcript. The HTML generator can perform the search on the closed-captioned text and emphasize those portions of the transcript that contain the keyword. For example, images that appear immediately prior to and after the occurrence of a keyword may be displayed at full resolution while other images may be displayed at a smaller size and resolution. FIG. 3 shows an example of this format after a search for the word "Tokyo." The smaller images may be hypertext links to the corresponding full sized images. In some cases, particularly for large HTML pictorial transcripts, hypertext anchors may be used in place of the small images to reduce bandwidth. If the keyword appears more than once in the transcript, a chain of links may be created among the individual occurrences of the word. For example, in FIG. 3, the arrows denote a link to other occurrences of the term "Tokyo." The HTML pictorial transcript may also include hypertext anchors to other HTML documents which contain material supplementary to, or related to, the information in the transcript.

The HTML generator may create an index page for the HTML pictorial transcript using conventional methods such as linguistic techniques, for example. FIG. 4 shows one example of such an index page, which may be located as the first page of the document. The index may contain links to the individual pages of the transcript. The index may also include other information such as index terms obtained by linguistic analysis techniques. In FIG. 4, a portion of the index is available for the user to list additional keywords to serve as index terms. The index terms may be hypertext links to those locations in the transcript where the terms appear.

Similar to the HTML documents previously discussed, HTML pictorial transcripts in which the representative frames are each associated with a corresponding audio segment may be arranged in a variety of different formats. For example, the individual representative frames may serve as links to the audio segment. Alternatively, anchors may be associated with the representative frames. By clicking on the anchors the respective audio segments are played.

It will be appreciated that those skilled in the art will be able to devise numerous arrangements which, although not explicitly shown or described herein, embody the principles of the invention. Accordingly, all such alternatives, modifications and variations which fall within the spirit and broad scope of the appended claims will be embraced by the principles of the invention. For example, while the invention has been described as electronic data representing a condensed version of a video program that is formatted as an HTML document for the World Wide Web, the invention is more generally applicable to such data that is formatted in any hypertext language suitable for electronic retrieval on a computer or over a communications network.

The invention claimed is:

1. A method executed in a processor comprising the steps of:

receiving a video program of full-motion video and associated with other information, said video program comprising segments, each of which includes a plurality of frames and an associated portion of said other information;

for each segment, selecting a representative frame from the plurality of frames in said segment, thereby forming a condensed electronic data module composed of said representative frame and said associated portion of said other information;

converting said condensed electronic data module for each said segment into hypertext representation;

forming a pictorial transcript by creating a document from a concatenation of said hypertext representations of said module for each said segment, in a format that allows interaction with a graphical browser from a concatenation of said representations, said pictorial transcript being a compressed representation of said applied video program in that the plurality of frames of each segment is reduced to a representative frame;

discarding representative frames for each video program segments that are shorter than a pre-selected time interval; and storing the document, printing the document, or presenting the document for viewing.

2. The method of claim 1 where said other information is audio or text.

3. The method of claim 2 where the hypertext representation of a module points to an audio file that contains said audio other information of the module.

4. The method of claim 2 where said text is close-caption text.

5. The method of claim 1 where the hypertext representation of a module points to a JPEG image file that contains said representative frame of said module.

6. The method of claim 1 further comprising a step of discarding a representative frame of a first module when the representative frame of a second module substantially as the same representative frame of the first module, and in said hypertext representation of said first module pointing to a file that contains the representative frame of said second module.

* * * * *